Aug. 16, 1932. M. G. ELDRED 1,871,595
BEEHIVE COVER
Filed Aug. 29, 1929 2 Sheets-Sheet 1
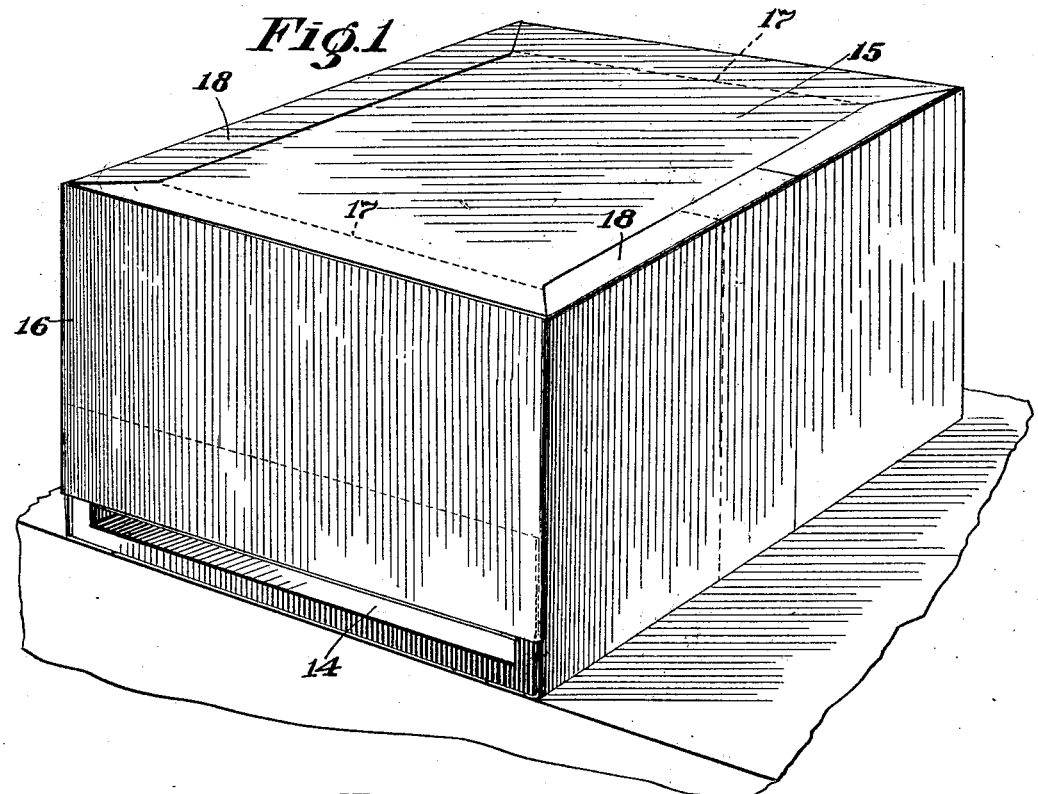
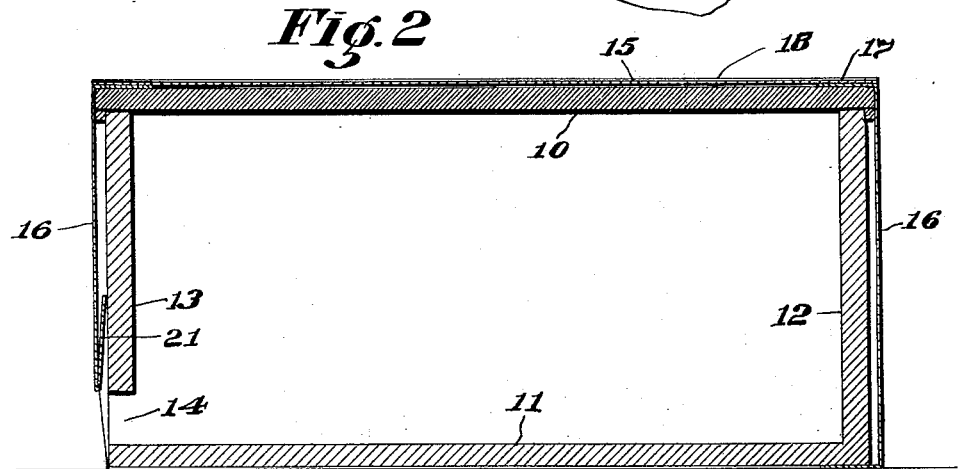
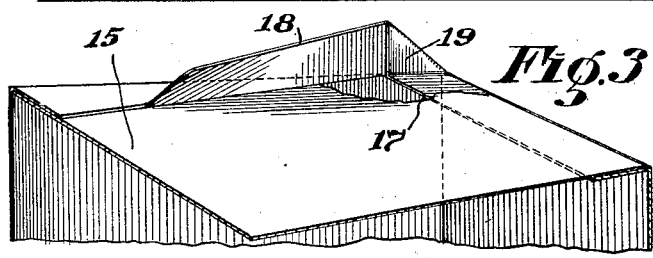
INVENTOR:
Merritt G. Eldred
BY Robt. P. Harris
ATTORNEY

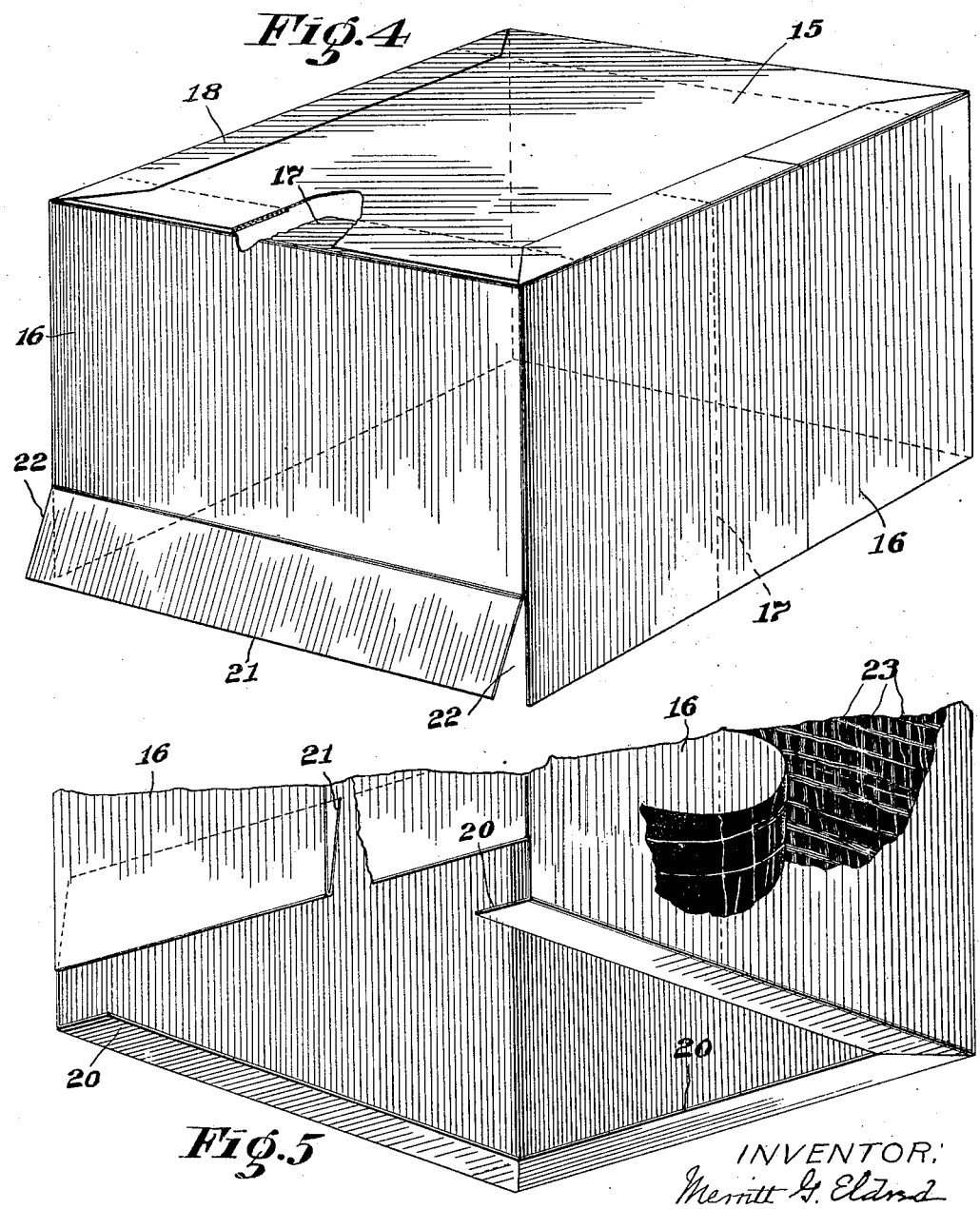

Patented Aug. 16, 1932

1,871,595

UNITED STATES PATENT OFFICE

MERRITT G. ELDRED, OF ONTARIOVILLE, ILLINOIS, ASSIGNOR TO AMERICAN REENFORCED PAPER COMPANY, OF ATTLEBORO, MASSACHUSETTS, A CORPORATION OF MASSACHUSETTS

BEEHIVE COVER

Application filed August 29, 1929. Serial No. 389,125.

This invention relates to a cover adapted to be placed over a beehive to protect the hive from wet and cold and windy weather.

Beehives as commonly constructed for use in keeping bees comprise a wooden box provided with a small opening through which the bees may enter and leave the hive.

These beehives usually remain out doors in all weather, and as a result difficulty has been experienced heretofore in maintaining the hives tight so that they will keep the bees warm and prevent wind, rain and snow from entering.

The present invention therefore relates to a simple and inexpensive beehive cover comprising a waterproof receptacle formed of paper and adapted to be placed in an inverted condition over a hive to help keep the bees warm and to keep out the wind, rain and snow.

A primary feature of the invention resides in a waterproof, bag-like receptacle adapted to be placed over a beehive to protect the same from the weather. A further feature of the invention resides in a bag-like cover for a beehive formed of paper so that it may be easily slipped over the hive in an inverted condition, and which may be readily removed from the hive, when access to the interior of the hive is desired.

Another feature of the invention resides in the construction whereby the beehive cover may be secured in place upon the hive by forming the side walls so that the lower ends thereof may be tucked under the hive; and still another feature of the invention resides in a beehive cover having a foldable flap which may be moved to and from a position to cover the opening through which the bees enter and leave the hive.

The above and other features of the invention will be hereinafter described in connection with the accompanying drawings which illustrate one good practical form thereof.

In the drawings:—

Fig. 1 is a perspective view of a beehive protected by a paper cover in accordance with the present invention;

Fig. 2 is a vertical sectional view through the hive and cover of Fig. 1;

Fig. 3 is a fragmentary perspective view of an upper corner of the beehive cover;

Fig. 4 is a perspective view of the cover ready to be placed over a beehive, the flap being shown in its lowered position, and Fig. 5 is an underneath perspective view of the lower portion of the beehive cover, the lower ends of the side walls being folded inwardly to extend under the bottom of the hive.

In the drawings, the beehive has been shown as comprising a box having the top 10, bottom 11, side walls 12, and front wall 13 at the lower end of which is formed the opening 14 through which the bees may enter and leave the hive; it will be understood, however, that the cover forming the subject matter of the present invention may be used upon beehives of any well known or preferred construction.

The beehive cover contemplated by the present invention is preferably formed of waterproof paper and is given a bag-like construction so that it may be placed over the beehive in an inverted condition to protect the top and sides of the beehive, as will be apparent from the drawings. The paper employed in forming the cover of the present invention may be cut or assembled in various ways to form a bag-like receptacle adapted to be readily placed over the beehive, and in the construction shown in the drawings this bag-like receptacle is formed of two sheets of paper; one sheet is cut substantially in the form of a square to constitute the top 15 of the inverted bag-like receptacle, and the top 15 is adhesively secured to inwardly folded portions of a second sheet of paper 16 which sheet of paper may be of sufficient length to extend entirely around the four vertical walls of the beehive and the ends of this sheet 16 may overlap, as indicated by 16a so that these overlapped ends may be adhesively secured together to form a tight joint.

It is important that the beehive cover shall be so constructed that it will keep the beehive dry under all weather conditions and it is therefore important that the paper be not only waterproof, but that the joints where the top 15 of the bag-like receptacle is secured to the side walls 16 shall be sufficiently tight to prevent driving rain or snow from entering these joints. While various forms of joints may be provided between the sheets of paper 15 and 16 to keep out the wet, these parts are united, in the construction shown, by folding the upper end portion of two opposite side walls of the sheet 16 inwardly under the top sheet 15, as indicated by 17, so that the under face of the sheet 15 is adhesively secured by a waterproof adhesive or cement to the upper face of the inwardly folded portions 17. In the construction shown, the upper end portions of the two remaining side walls of the sheet 16 are folded inwardly over the sheet 15 as indicated at 18 and are adhesively secured to the upper face of the sheet 15, as will be apparent from Figs. 1 and 4. The inwardly folded portions 17 and 18 are preferably not severed from each other at their adjacent ends since if these end portions are cut or severed water might enter the paper receptacle adjacent such cut ends. The entrance of moisture adjacent the ends of the inwardly turned portions 17 and 18 may be prevented, however, by folding the portions 18 over the portions 17 without severing the connection between these two portions, as will be apparent from Fig. 3, wherein it will be seen that the folded portion 19 constitutes an uncut connection between the inwardly folded portions 17 and 18, thus forming a water-tight joint.

The bag-like cover of the present invention is preferably made slightly larger than the beehive so that it may be easily slipped over the beehive and readily removed therefrom when access to the interior of the beehive, for example, by removing the cover 10, is desired.

Since the beehive cover is preferably so constructed that it may be readily lifted off the beehive, it might be accidentally removed from the beehive by the wind, but this is readily prevented in accordance with the present invention, by making the side walls of the bag-like receptacle long enough to permit the end portions of such side walls to be tucked under the bottom of the beehive, as indicated at 20, so that the weight of the beehive resting upon these end portions 20 will securely hold the beehive cover in place upon the hive, and thus prevent the cover from being picked up off the beehive by the wind or otherwise accidentally removed.

The portion of the beehive cover which extends downwardly over the entrance 14 of the beehive is preferably provided with a foldable flap 21 which flap is readily formed by cutting the bag-like receptacle along the edges thereof, as indicated by 22, so that this flap may be folded upward, as shown in Figs. 1 and 2, out of the way of the entrance 14 to the beehive, or may be lowered over the entrance, as shown in Fig. 4, to prevent rain or snow from entering the opening 14 in stormy weather.

While various forms of waterproof paper may be employed in constructing the beehive cover of the present invention, excellent results are secured by forming the cover of a two-ply paper the inner faces of which are coated with a waterproofing substance, as will be apparent from Fig. 5, and when it is desired to increase the strength of the paper employed in forming the beehive cover, this may be accomplished by reenforcing the paper either longitudinally or transversely, or both longitudinally and transversely, with reenforcing filaments 23, as shown in Fig. 5. While various forms of reenforcing filaments may be employed to this end, good results are secured by employing long, unspun fibres such as sisal, or the like, which fibres are adhesively secured between the two sheets of paper by a waterproof adhesive such as black asphaltum.

It will be seen from the foregoing that a waterproof beehive cover constructed in accordance with the present invention will serve to protect the top and sides of the beehive in all kinds of weather, and will keep out the rain, wind and snow. It will also be seen that the beehive covers may be constructed at low cost and may be readily folded so that they can be shipped in a flat condition, and a number of beehive covers may be readily stacked one above the other for shipment in a compact package, or for storage when not in use.

What is claimed is:—

As an article of manufacture, a beehive cover formed of flexible waterproof paper having side walls and a top, watertight joints connecting the side walls and top, and a foldable flap constituting part of one of the side walls for closing or leaving open the entrance to the beehive.

In testimony whereof, I have signed my name to this specification.

MERRITT G. ELDRED.